(12) United States Patent
Tomita et al.

(10) Patent No.: US 12,067,303 B2
(45) Date of Patent: Aug. 20, 2024

(54) IMAGE FORMING SYSTEM AND IMAGE FORMING METHOD

(71) Applicant: SHARP KABUSHIKI KAISHA, Sakai (JP)

(72) Inventors: Chikako Tomita, Sakai (JP); Akitoshi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/222,820

(22) Filed: Jul. 17, 2023

(65) Prior Publication Data
US 2024/0028268 A1   Jan. 25, 2024

(30) Foreign Application Priority Data

Jul. 21, 2022 (JP) ................................. 2022-116597
May 12, 2023 (JP) ................................. 2023-079550

(51) Int. Cl.
*G06F 3/12* (2006.01)

(52) U.S. Cl.
CPC .......... *G06F 3/1204* (2013.01); *G06F 3/1238* (2013.01); *G06F 3/1254* (2013.01); *G06F 3/1288* (2013.01); *G06F 3/1293* (2013.01)

(58) Field of Classification Search
CPC .... G06F 3/1204; G06F 3/1285; G06F 3/1254; G06F 3/1286; G06F 21/608; G06F 3/1208; G06F 3/1245; G06F 3/1247; G06F 3/1248; G06F 3/1284; G06F 3/1225; G06F 3/1205; G06F 3/1207; G06F 3/1229; G06F 3/1253; G06F 3/1256; G06F 3/1257; G06F 3/1273; G06F 3/0625; G06F 3/0665; G06F 3/067; G06F 3/1238; G06F 3/1258; G06F 3/126; G06F 3/1261; G06F 3/1267; G06F 3/1274; G06F 3/1293; G03G 15/0115; G03G 15/04027; G03G 15/5041; G03G 2215/2006; G03G 15/2039;
(Continued)

(56) References Cited

U.S. PATENT DOCUMENTS

| | | | | |
|---|---|---|---|---|
| 8,469,471 | B2 * | 6/2013 | Kikuchi | B41J 2/17546 347/14 |
| 10,212,301 | B2 * | 2/2019 | Hirai | G06F 3/1229 |
| 2004/0161257 | A1 * | 8/2004 | Ishihara | G06K 15/00 399/81 |
| 2009/0168103 | A1 * | 7/2009 | Yamada | G06F 3/1257 358/1.15 |

(Continued)

FOREIGN PATENT DOCUMENTS

JP    2000-270148 A    9/2000

*Primary Examiner* — Negussie Worku
(74) *Attorney, Agent, or Firm* — ScienBiziP, P.C.

(57) ABSTRACT

An image forming system includes an image forming apparatus includes an operation panel, the image forming apparatus forming an image based on image data; and a user terminal having a printer driver capable of configuring preliminary setting information pertaining to formation of the image. The user terminal is able to transmit the preliminary setting information configured by the printer driver to the image forming apparatus. When the image forming apparatus is accessed by a user after receiving the preliminary setting information, the image forming apparatus transitions to an image-data acquisition standby state to accept an operation to acquire image data, and when the image data is acquired, the image forming apparatus forms an image based on the image data by applying the preliminary setting information.

6 Claims, 24 Drawing Sheets

(58) Field of Classification Search
CPC ........... G03G 15/2064; G03G 15/5062; G03G 2215/00426; G03G 2215/00805; G03G 15/161; G03G 2215/00021; G03G 2215/1695; G03G 2215/2077; G03G 15/502; G03G 15/6508; G03G 21/1657; G06K 15/1881; G06K 15/10; G06K 15/102; G06K 15/107; G06K 15/1872; G06K 15/00; G06K 15/005; H04N 1/4072; H04N 1/54; H04N 1/00421; H04N 1/00432; H04N 1/0044; H04N 1/00482; H04N 1/32502; H04N 1/32534; H04N 1/6033; B41M 5/0023; B41M 5/0047; B41M 5/0064; B41M 7/0081; G02B 30/27; G03B 25/02; G03B 35/18; G03B 35/24
USPC ........................................................ 358/1.15
See application file for complete search history.

(56) References Cited

U.S. PATENT DOCUMENTS

| | | | |
|---|---|---|---|
| 2011/0128574 A1* | 6/2011 | Kouno | H04N 1/00408 358/1.15 |
| 2013/0003106 A1* | 1/2013 | Nishida | G06F 3/1222 358/1.14 |
| 2013/0179961 A1* | 7/2013 | Abe | G06F 21/44 726/9 |
| 2017/0171426 A1* | 6/2017 | Park | H04N 1/00307 |
| 2019/0102120 A1* | 4/2019 | Kaneko | G06F 3/1274 |
| 2019/0174015 A1* | 6/2019 | Sugita | H04N 1/32122 |
| 2019/0203076 A1* | 7/2019 | Uang | C09J 5/06 |
| 2019/0205006 A1* | 7/2019 | Li | G06F 3/1279 |
| 2019/0324700 A1* | 10/2019 | Sugiyama | G06F 3/1285 |
| 2020/0174729 A1* | 6/2020 | Kanematsu | G06F 11/0733 |
| 2020/0341708 A1* | 10/2020 | Kaneda | G06F 3/1288 |

* cited by examiner

FIG. 6

(SETTING DATA PART)
@PJL JOB NAME=" QUOTATION.xlsx"
@PJL SET PCNAME="PC7654321"
@PJL SET DRIVERNAME="MX-M7570 SPDL2"
@PJL SET FILING=OFF
@PJL SET USERNAME="AOKIICHIRO"
@PJL SET QTY=1
@PJL SET DUPLEX=OFF
@PJL SET STAPLE=OFF
@PJL SET PUNCH=OFF
@PJL SET LOGINID="ID7654321"
@PJL SET PASSWORD="j8WCeB8uivBfcgXaNxQ1aA=="
@PJL SET EXPIRATION=NONE
@PJL SET PRESET=OFF

(PDL PART)
Q no chi 8n e 0 ki 0 te 0 tu 0 Regular145BMP・R chi d・tu c・S IKU ...

@PJL EOJ

FIG. 7

```
@PJL JOB NAME=" PRELIMINARY SETTINGS"
@PJL SET PCNAME="PC7654321"
@PJL SET DRIVERNAME="MX-M7570 SPDL2"
@PJL SET FILING=OFF
@PJL SET USERNAME="AOKIICHIRO"
@PJL SET QTY=1
@PJL SET DUPLEX=OFF
@PJL SET STAPLE=OFF
@PJL SET PUNCH=OFF
@PJL SET LOGINID="ID7654321"
@PJL SET PASSWORD="j8WCeB8uivBfcgXaNxQ1aA=="
@PJL SET EXPIRATION=NONE
@PJL SET PRESET =ON

@PJL EOJ
```

FIG. 8

```
@PJL JOB NAME="PRELIMINARY SETTINGS"
@PJL SET PCNAME="PC7654321"
@PJL SET DRIVERNAME="MX-M7570 SPDL2"
@PJL SET FILING=OFF
@PJL SET USERNAME="AOKIICHIRO"
@PJL SET QTY=1
@PJL SET DUPLEX=OFF
@PJL SET STAPLE=OFF
@PJL SET PUNCH=OFF
@PJL SET LOGINID="ID7654321"
@PJL SET PASSWORD="j8WCeB8uivBfcgXaNxQ1aA=="
@PJL SET EXPIRATION=10min
@PJL SET PRESET =ON

@PJL EOJ
```

FIG. 10

```
@PJL JOB NAME="PRELIMINARY SETTINGS"
@PJL SET PCNAME="PC7654321"
@PJL SET DRIVERNAME="MX-M7570 SPDL2"
@PJL SET FILING=OFF
@PJL SET USERNAME="AOKIICHIRO"
@PJL SET QTY=1
@PJL SET DUPLEX=OFF
@PJL SET STAPLE=OFF
@PJL SET PUNCH=OFF
@PJL SET LOGINID="ID7654321"
@PJL SET PASSWORD="j8WCeB8uivBfcgXaNxQ1aA=="
@PJL SET EXPIRATION=10min
@PJL SET PRESET =ON
@PJL SET ADRS="aokiichiro@*corp.com"**

@PJL EOJ
```

FIG. 18

| JOB TEMPLATE SELECTION | | | |
|---|---|---|---|
| REGISTER UPDATE | | | SELECT |
| SETTING TEMPLATE LIST | EXPIRATION DATE | ADD | DELETE |
| ⦿ TEMPLATE (1) | 2022/03/31 | | |
| ▲ TEMPLATE (2) | NONE | ▶ | |
| ○ TEMPLATE (3) | NONE | | |
| ▲ TEMPLATE (4) | 2022/01/31 | | ▶ |
| ▲ TEMPLATE (5) | NONE | | |
| REGISTER UPDATE | | | |

FIG. 19

| | TEMPLATE(1) <PARENT TEMPLATE> | TEMPLATE(2) <DIFFERENCE> | SETTINGS CONTENT REFLECTED (1)+(2) |
|---|---|---|---|
| COLOR MODE | COLOR | | COLOR |
| RESOLUTION | | 600x600 | 600x600 |
| DOCUMENT | | | AUTO (DEFAULT) |
| FORMAT | | TIFF | TIFF |
| SAVE TO | FOLDER 1 | | FOLDER 1 |
| USER NAME | | USER 1 | USER 1 |
| ATTRIBUTE | | SHARE | SHARE |
| DENSITY | | PRINTED PHOTOGRAPH | PRINTED PHOTOGRAPH |
| CONTRAST | AUTO | | AUTO |
| DOWNLOAD FILE CREATION | ON | | ON |
| ... | | | |

FIG. 20

| | TEMPLATE(3) <PARENT TEMPLATE> | TEMPLATE(4) <DIFFERENCE> | SETTINGS CONTENT REFLECTED (3) (4) |
|---|---|---|---|
| COLOR MODE | COLOR | | COLOR |
| RESOLUTION | 600x600 | 200x200 | AUTO (DEFAULT) |
| DOCUMENT | | | AUTO (DEFAULT) |
| FORMAT | TIFF | | TIFF |
| SAVE TO | FOLDER 1 | TEMP | STANDARD FOLDER (DEFAULT) |
| USER NAME | USER 1 | | USER 1 |
| ATTRIBUTE | SHARE | | SHARE |
| DENSITY | PRINTED PHOTOGRAPH | AUTO | AUTO (DEFAULT) |
| CONTRAST | AUTO | | AUTO |
| DOWNLOAD FILE CREATION | ON | OFF | OFF |

FIG. 21

| JOB TEMPLATE SELECTION | | | | |
|---|---|---|---|---|
| REGISTER UPDATE | | | | SELECT |
| SETTING TEMPLATE LIST | EXPIRATION DATE | DELETE AFTER PRINTING | CREATE NEW TEMPLATE | |
| ⦿ TEMPLATE (1) | 2022/03/31 | ☐ | | |
| ▲ TEMPLATE (2) | NONE | ☑ | ☑ | |
| ○ TEMPLATE (3) | NONE | ▨ | ▨ | |
| ▲ TEMPLATE (4) | 2022/01/31 | ▨ | ▨ | |
| ▲ TEMPLATE (5) | NONE | ▨ | | |

NEW TEMPLATE NAME: TEMPLATE (6)

UPDATE

REGISTER

FIG. 22

| | TEMPLATE(1)<br><PARENT TEMPLATE> | TEMPLATE(2)<br><DIFFERENCE> | SETTINGS CONTENT<br>REFLECTED (SAVED)<br>TEMPLATE (6) |
|---|---|---|---|
| COLOR MODE | COLOR | | COLOR |
| RESOLUTION | | 200x200 | 200x200 |
| DOCUMENT | | | AUTO (DEFAULT) |
| FORMAT | TIFF | | TIFF |
| SAVE TO | FOLDER 1 | TEMP | TEMP |
| USER NAME | USER 1 | | USER 1 |
| ATTRIBUTE | SHARE | | SHARE |
| DENSITY | PRINTED PHOTOGRAPH | AUTO | AUTO |
| CONTRAST | AUTO | | AUTO |
| DOWNLOAD FILE CREATION | ON | OFF | OFF |

FIG. 24

DETAILED SETTINGS OF SET JOB

☑ JOB TYPE
[SAVE SCAN ▾]

☐ EXPIRATION DATE
[NONE ▾]

☐ FILE NAME
[                    ]

☐ DESTINATION
[                    ]
[ACQUIRE FROM ADDRESS BOOK...]

SCAN SAVE
☐ SAVE TO
[                    ]
[BROWSE]

☐ ATTRIBUTE
[SHARE ▾]

☐ USER NAME
[                    ]

☐ PASSWORD
[                    ]

E-mail
☐ SENDER
[                    ]
[ACQUIRE FROM ADDRESS BOOK...]
☐ SUBJECT
[                    ]

☐ BODY
[                    ]

TRANSMISSION DESTINATION(S)

| ID | NAME | E-mail | FTP | DESKTOP | SHARED FOL... | INTER... |
|----|------|--------|-----|---------|---------------|----------|
|    |      |        |     |         |               |          |

[ADD FROM ADDRESS BOOK...]  [DELETE(E)]  [DELETE ALL(C)]

SHARED FOLDER
☐ FOLDER PATH
[                    ]
[ACQUIRE FROM ADDRESS BOOK...]

☐ USER NAME
[                    ]

☐ PASSWORD
[                    ]

[RESET TO STANDARD(E)]          [OK]  [CANCEL]

FIG. 25

```
@PJL JOB NAME="QUOTATION.xlsx"
@PJL SET PCNAME="PC7654321"
@PJL SET DRIVERNAME="MX-M7570 SPDL2"
@PJL SET FILING=OFF
@PJL SET USERNAME="AOKIICHIRO"
@PJL SET QTY=1
@PJL SET DUPLEX=OFF
@PJL SET STAPLE=OFF
@PJL SET PUNCH=OFF
@PJL SET LOGINID="ID7654321"
@PJL SET PASSWORD="j8WCeB8uivBfcgXaNxQ1aA=="
@PJL SET EXPIRATION=NONE
@PJL SET PRESET=ON Q no chi 8n e 0 ki 0 te 0 tu 0 Regular145BMP・R chi d・tu c・S
IKU ...

@PJL EOJ
```

IMAGE FORMING SYSTEM AND IMAGE FORMING METHOD

CROSS-REFERENCE TO RELATED APPLICATION

The present application claims priority from Japanese Application JP2022-116597 and Japanese Application JP2023-079550, the content of which is hereby incorporated by reference into this application.

BACKGROUND OF THE INVENTION

1. Field of the Invention

The disclosure relates to an image forming system and an image forming method.

2. Description of the Background Art

Conventionally, when performing jobs such as scanning, printing, and sending e-mails and faxes with an image forming apparatus such as a multifunction peripheral (MFP), as user can configure various settings such as scanning and printing settings and e-mail and fax destination settings on an operation panel of the image forming apparatus.

However, since the operation panel of an image forming apparatus generally has a small screen and requires repeated touches to switch screens, when a user want to make detailed settings, the operation often becomes cumbersome and wastes more time than necessary.

To reduce the time and effort required for a user to establish settings for each printing operation, a function is known that allows registration of the most frequently used settings used by a user in advance, calls up the settings to be used from the registered program when an actual job is executed, and reflects the settings in the job, such as scanning.

For example, as a conventional technology, an image reading device and system are disclosed in which a job template registered on a server is retrieved, a document is read under the conditions described in the job template, and the read image is sent to another device according to the contents described in the job template, thereby reducing the load on the network and server and making it possible to easily perform routine processing on the read image.

SUMMARY OF THE INVENTION

However, the conventional technology is not very convenient for users because it requires an operation to select and recall the program a user wants to use from among the registered programs on the operation panel of the image forming apparatus.

An object of the disclosure, which is made in consideration of the above circumstances, is to provide an image forming system and an image forming method that reduce the user's operational burden and increase convenience in the setting of jobs in an image forming apparatus more than before.

An image forming system according to an aspect of the disclosure includes: an image forming apparatus comprising an operation panel, the image forming apparatus forming an image based on image data; and a user terminal having a printer driver capable of configuring preliminary setting information pertaining to formation of the image, wherein, the user terminal is able to transmit the preliminary setting information configured by the printer driver to the image forming apparatus, and when the image forming apparatus is accessed by a user after receiving the preliminary setting information, the image forming apparatus transitions to an image-data acquisition standby state to accept an operation to acquire image data, and when the image data is acquired, the image forming apparatus forms an image based on the image data by applying the preliminary setting information.

An image forming method according to an aspect of the disclosure, which is a method of an image forming apparatus that forms an image based on image data, includes: configuring preliminary setting information pertaining to formation of the image by a printer driver of a user terminal connected to the image forming apparatus via a network; receiving the preliminary setting information transmitted from the user terminal; transitioning to an image-data acquisition standby state and accepting an operation to acquire image data when a user accesses the image forming apparatus after the preliminary setting information is received; and applying the preliminary setting information and forming an image based on the image data when the image forming apparatus acquires the image data.

An aspect of the disclosure can realize an image forming system and an image forming method that reduce the user's operational burden and increase convenience in the setting of jobs in an image forming apparatus more than before.

BRIEF DESCRIPTION OF THE DRAWINGS

FIG. 6 is an explanatory diagram illustrating an example of usual print job data of the digital multifunction machine illustrated in FIG. 1.

FIG. 7 is an explanatory diagram illustrating an example of print job data of a digital multifunction machine of when the "Send settings in advance" checkbox is checked on the printer driver setting screen on the display of the user terminal illustrated in FIG. 1.

FIG. 8 is an explanatory diagram illustrating an example of print job data of a digital multifunction machine of when the expiration time is set to "10 minutes" on the setting screen of the printer driver displayed on the display of the user terminal illustrated in FIG. 1.

FIG. 10 is an explanatory diagram illustrating an example of print job data in which settings regarding personal information, such as the destination, or security information have been deleted when personal information and security information is included in the preliminary setting information for a print job of the digital multifunction machine illustrated in FIG. 1.

FIG. 18 is an example of a selection screen of a print setting list displayed on the display of a digital multifunction machine in the image forming system according to the second embodiment of the disclosure.

FIG. 19 is a table showing an example of new setting information created by adding settings of difference templates while using, as the parent template, setting information saved in the storage of a digital multifunction machine in the image forming system according to the second embodiment of the disclosure.

FIG. 20 is a table showing an example of new setting information created by deleting settings of difference templates while using, as the parent template, setting information saved in the storage of a digital multifunction machine in the image forming system according to the second embodiment of the disclosure.

FIG. 21 is an example of a selection screen of a print setting list displayed on the display of a digital multifunction machine in an image forming system according to a third embodiment of the disclosure.

FIG. 22 is a table showing an example of new setting information created by prioritizing settings of difference templates while using, as the parent template, setting information saved in the storage of a digital multifunction machine in the image forming system according to the third embodiment of the disclosure.

FIG. 24 is an explanatory diagram illustrating an example of a detailed setting screen of a print job for a printer driver displayed on a display of a user terminal in the image forming system according to the fourth embodiment of the disclosure.

FIG. 25 is an explanatory diagram illustrating an example print job data of a digital multifunction machine in an image forming system according to a fifth embodiment of the disclosure.

DETAILED DESCRIPTION OF THE INVENTION

Figure 1:
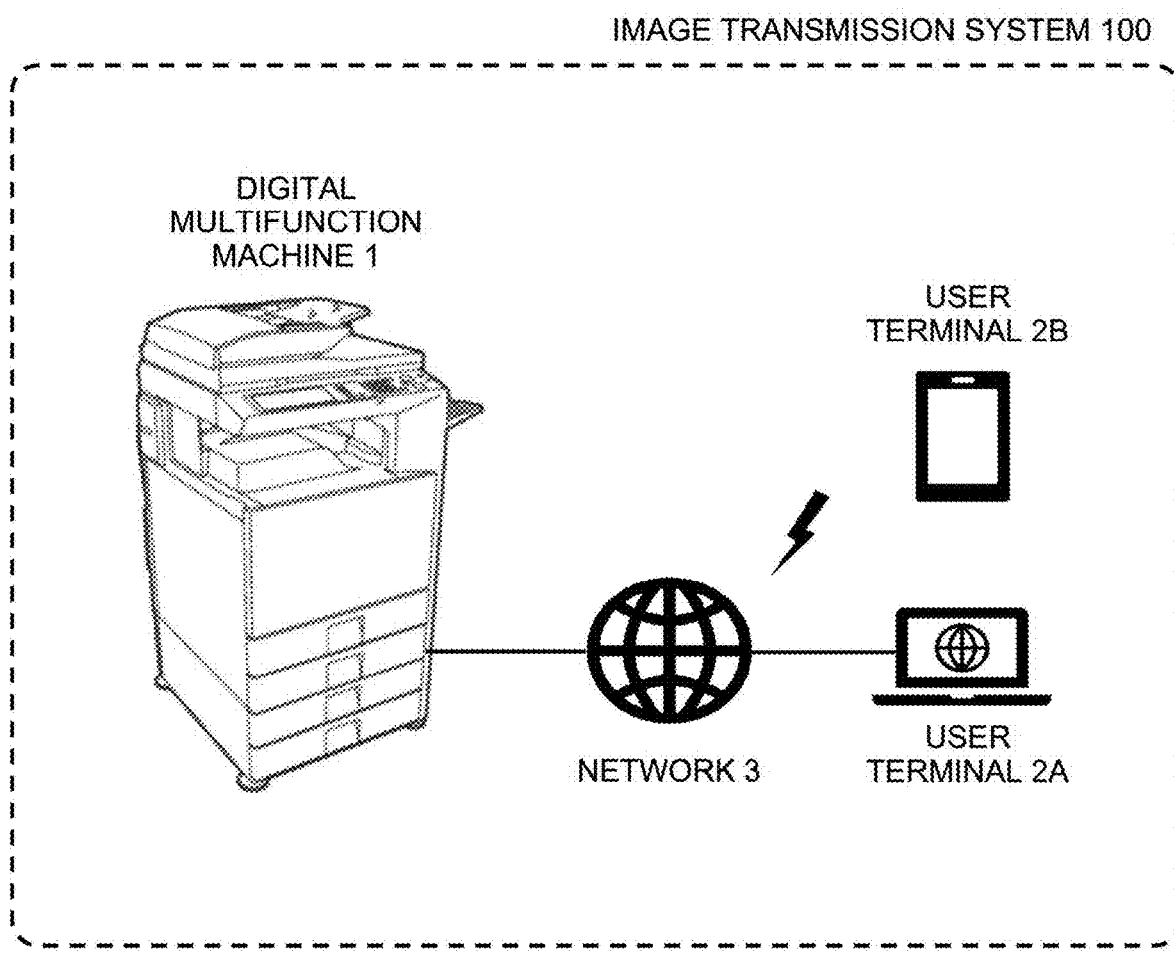
FIG. 1 is an explanatory diagram illustrating a schematic configuration of an image forming system including a digital multifunction machine of the disclosure.

In the disclosure, the "image forming apparatus" is a device that forms and outputs an image, including a copying machine or a multifunction peripheral having a copying function (copy function), such as a printer using an electrophotographic method for image formation with toner, or an MFP including functions other than copying. The "printer driver" is, for example, software that runs on a user terminal that can communicate with the image forming apparatus via a network to provide printing instructions and setting the image forming apparatus. The "user terminal" is not limited to a personal computer (PC) but can also be a mobile information terminal such as a smartphone and a tablet, an electronic blackboard, an information display, and the like. The phrase "when a user accesses the system" means, for example, when a user logs in to the image forming apparatus or when a user touches the operation panel of the image forming apparatus to wake it up from a sleep mode and put it in a state to accept operations. The "image data acquisition standby state" is a state in which image data acquisition operations are accepted, for example, a scan standby state.

Preferred modes of the disclosure is described below.

In the image forming system according to the disclosure, the preliminary setting information may include a setting for an expiration time; when the image forming apparatus is accessed by a user after receiving the preliminary setting information, if it is within an expiration time of the preliminary setting information, the image forming apparatus may transition to the image-data acquisition standby state to accept an operation to acquire the image data; and when the expiration time has passed, a predetermined initial screen may be displayed on the operation panel without application of the preliminary setting information.

In this way, when the preliminary setting information is received from the user terminal under the job settings of the image forming apparatus, and if the preliminary setting information is not expired, the image forming system transitions to an image-data acquisition standby state, so that the image forming system can be realized such that it reduces the user's operational burden and increases convenience.

In the image forming system according to the disclosure, the user terminal may set whether or not user authentication is required when the preliminary setting information is transmitted to the image forming apparatus, and when user authentication is not set, settings pertaining to personal information and security information may be deleted from the preliminary setting information before the preliminary setting information is transmitted to the image forming apparatus.

In this way, when user authentication is not established when the preliminary setting information is transmitted from the user terminal to the image forming apparatus, the preliminary setting information is transmitted to the image forming apparatus after the settings pertaining to the personal information and the security information are deleted from the preliminary setting information, so that the image forming system can be realized such that it reduces the user's operational burden and increases convenience.

In the image forming system according to the disclosure, the image forming apparatus may further include a user authenticator that accepts login authentication of a user; when a user who accepted the login authentication is a user of the user terminal that transmitted the preliminary setting information, the image forming apparatus may transition to the image-data acquisition standby state to accept an operation to acquire the image data, and when the image data is acquired, an image based on the image data may be formed by applying the preliminary setting information; and when the user who accepted the login authentication is not the user of the user terminal that transmitted the preliminary setting information, a predetermined initial screen may be displayed on the operation panel.

In this way, when the preliminary setting information is received from the user terminal under the job settings of the image forming apparatus, and when the user who accepted login authentication is the user of the user terminal that transmitted the preliminary setting information, the image forming system transitions to an image-data acquisition standby state, so that the image forming system can be realized such that it reduces the user's operational burden and increases convenience.

In the image forming system according to the disclosure, when the preliminary setting information is saved in the image forming apparatus, the user terminal may transmit the preliminary setting information corresponding to an added portion or a deleted portion of the preliminary setting information to the image forming apparatus; and when the image forming apparatus is accessed by a user after receiving the preliminary setting information corresponding to the added portion or the deleted portion of the preliminary setting information, the image forming apparatus may transition to the image-data acquisition standby state to accept an operation to acquire the image data, and when the image data is acquired, an image based on the image data may be formed by reflecting and applying the preliminary setting information corresponding to the added portion or the deleted portion of the preliminary setting information is reflected to the preliminary setting information.

In this way, in the settings of the job of the image forming apparatus, when there is saved preliminary setting information and some of the pre-settings is desired to be changed and applied to the preliminary setting information, the change in some of the pre-settings can be reflected and applied to form an image based on the image data, so that the image forming system can be realized such that it reduces the user's operational burden and increases convenience.

Hereinafter, a further detailed description will be made on the disclosure with reference to the drawings. The following description is illustrative in all respects and should not be construed as limiting the disclosure.

First Embodiment

Schematic Configuration of Image Forming System 100

With reference to FIG. 1, a configuration of an image forming system 100 including a digital multifunction machine 1 as an example of the image forming apparatus of the disclosure will be described.

FIG. 1 is an explanatory diagram illustrating a schematic configuration of the image forming system 100 including the digital multifunction machine 1 of the disclosure.

As illustrated in FIG. 1, in the image forming system 100, the digital multifunction machine 1 is connected to user terminals 2A and 2B in a wired manner or via a wireless network 3.

In the following description, the user terminals 2A and 2B are collectively referred to as user terminals 2.

The digital multifunction machine 1 is an apparatus such as a multifunction machine or an MFP that digitally processes image data and has a copy function, a printer function, a scanner function, and a facsimile function.

The user terminals 2 are terminal such as personal computers (PCs) and tablets or mobile terminals such as smartphones. The user terminals 2 transmit image data to the digital multifunction machine 1 via the network 3 so as to have jobs such as printing executed.

Schematic Configuration of Digital Multifunction Machine 1

Figure 2:
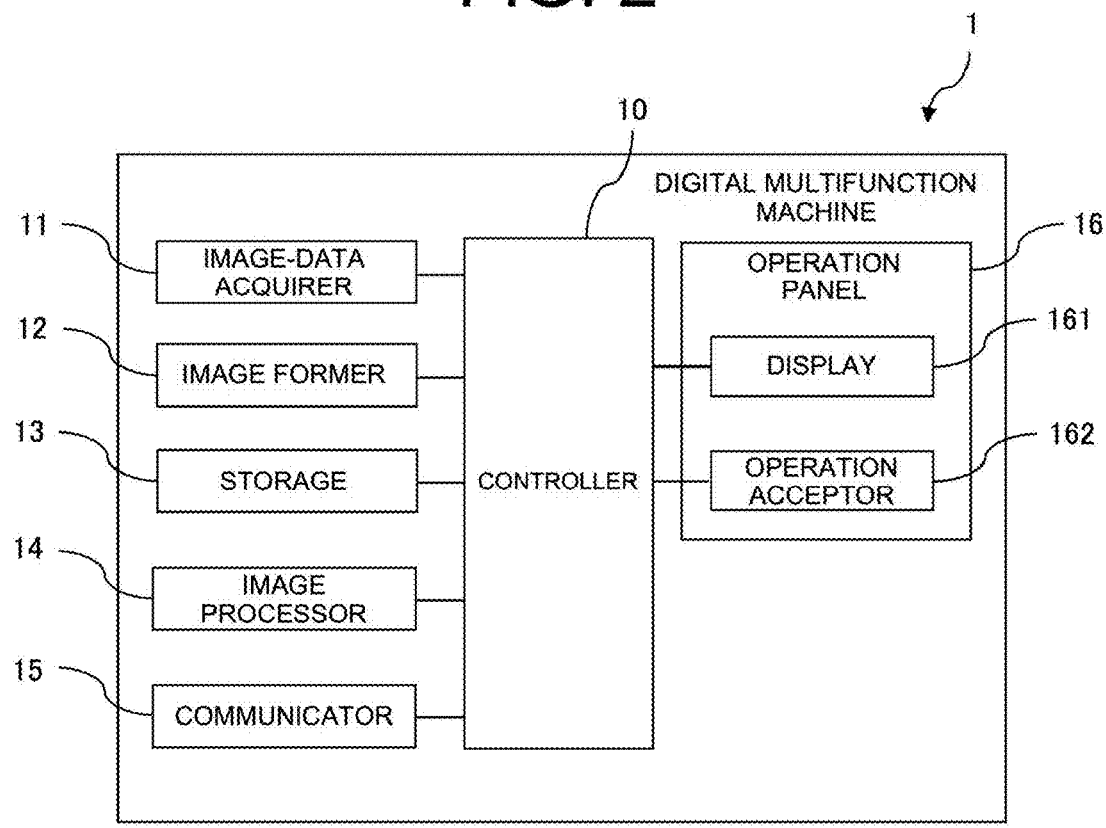
FIG. 2 is a block diagram illustrating a schematic configuration of the digital multifunction machine illustrated in FIG. 1.

A schematic configuration of the digital multifunction machine 1 will now be described with reference to FIG. 2. FIG. 2 is a block diagram illustrating a schematic configuration of the digital multifunction machine 1 illustrated in FIG. 1.

As illustrated in FIG. 2, the digital multifunction machine 1 includes a controller 10, an image-data acquirer 11, an image former 12, a storage 13, an image processor 14, a communicator 15, and an operation panel 16.

Each component of the digital multifunction machine 1 will now be described.

The controller 10 comprehensively controls the digital multifunction machine 1 and includes a central processing unit (CPU), a random access memory (RAM), a read only memory (ROM), and various interface circuits.

The controller 10 performs detection of each sensor and monitoring/control of all loads such as a motor, a clutch, and the operation panel 16 in order to comprehensively control the operation of the digital multifunction machine 1.

The image-data acquirer 11 is a part that detects and reads a document placed on a document table or a document transported from a document tray and generates image data.

The image data may be acquired from an external information processing device or the like in a wired manner or via the wireless network 3 or recorded on a USB stick or the like, or the image data may be acquired through a combination of the above methods.

The image former 12 is a part that prints out image data, which is acquired by the image-data acquirer 11 and is processed by the image processor 14, onto a sheet.

The storage 13 is an element or a storage medium that stores information required to realize the various functions of the digital multifunction machine 1, control programs, and the like. For example, a semiconductor device such as a RAM or a ROM, a storage medium such as a hard disk, a flash storage, or a solid state drive (SSD) is used.

The storage 13 stores data required for execution of a job, such as information on a printing job or the like and image data.

The program and the data may be held in different devices such that an area holding data is constituted by a hard disk drive and an area holding a program is constituted by a flash storage.

The image processor 14 is a part that converts the image data input from the image-data acquirer 11 into an appropriate electrical signal on the basis of a job command, such as printing, input from an operation acceptor 162 and processes the signal to be suitable for output such as enlargement and reduction.

The communicator 15 is a part that communicates with external devices such as the user terminals 2 via the network 3 and transmits/receives data and the like to/from these external devices.

The operation panel 16 includes a display panel including a liquid crystal panel and a touch panel employing a capacitive method or the like that overlaps with the display panel and detects a position touched by a finger, and the operation panel 16 includes a display 161 and an operation acceptor 162.

The display 161 is a part that displays various types of information. The display 161 is includes, for example, a cathode ray tube (CRT) display, a liquid crystal display, or an electroluminescence (EL) display, and is a display device, such as a monitor or a line display, for an operating system or application software to display electronic data of a processing state or the like. The controller 10 displays the operation and the state of the digital multifunction machine 1 through the display 161.

The operation acceptor 162 is an interface for operating the digital multifunction machine 1, and is a part that accepts a command from and user.

Schematic Configuration of User Terminal 2

The schematic configuration of the user terminal 2 will now be described with reference to FIG. 3.

Figure 3:
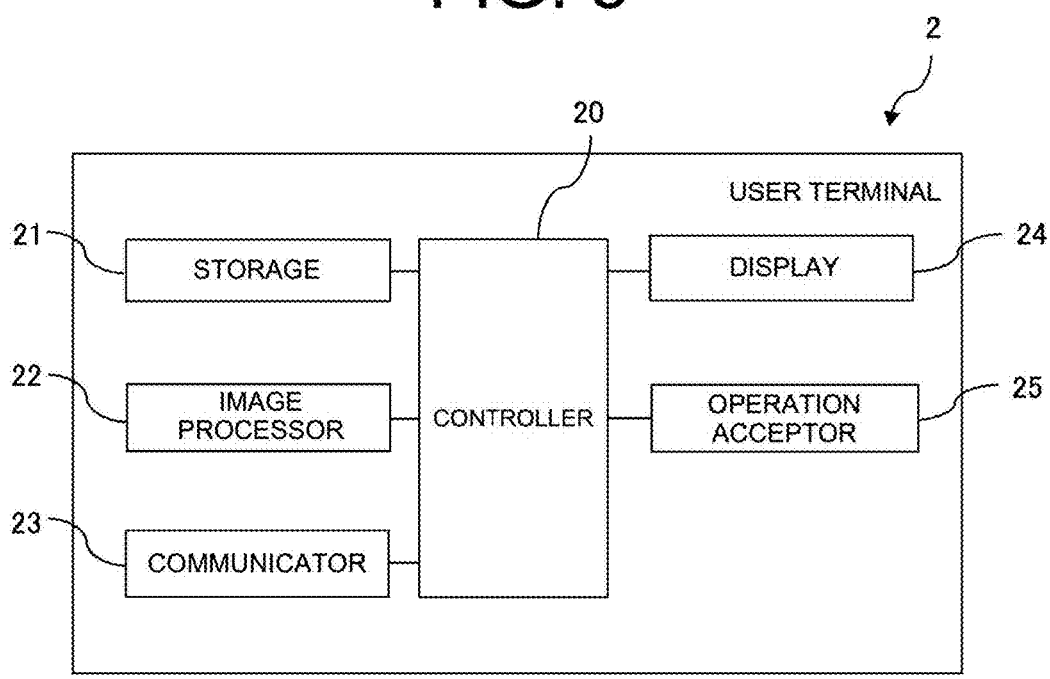
FIG. 3 is a block diagram illustrating a schematic configuration of a user terminal illustrated in FIG. 1.

FIG. 3 is a block diagram illustrating a schematic configuration of the user terminal 2 in FIG. 1.

As illustrated in FIG. 3, the user terminal 2 includes a controller 20, a storage 21, an image processor 22, a communicator 23, a display 24, and an operation acceptor 25.

Each component of the user terminal 2 will now be described.

The controller 20 is a part that comprehensively controls the user terminal 2 and includes a CPU, a RAM, a ROM, various interface circuits and the like.

The storage 21 is an element or a storage medium that stores information required for realizing various functions of the user terminal 2, a control program, and the like. For example, a semiconductor device such as a RAM or a ROM or a storage medium such as a hard disk, a flash storage, or an SSD is used.

The image processor 22 is a part that converts image data to be displayed on the display 24 into an appropriate electrical signal on the basis of an operation instruction from the operation acceptor 25 and processes the electrical signal to be suitable for output such as enlargement and reduction.

The communicator 23 is a part that communicates with the digital multifunction machine 1 via the network 3 and transmits/receives data and the like such as preliminary setting information required for the print job.

The display 24 is a part that displays various types of information of the user terminal 2.

The operation acceptor 25 is an interface for operating the user terminal 2 and is a part that accepts a command from the user.

The display 24 and the operation acceptor 25 may be implemented by a display panel including a liquid crystal panel and a touch panel employing a capacitive method or the like that overlaps with the display panel and detects a position touched by a finger.

Transmission/reception Process of Preliminary Setting Information of Print Job of Image Forming System 100 According to First Embodiment Transmission and reception processes of preliminary setting information of a print job for the image forming system 100 according to the first embodiment of the disclosure will now be explained with reference to FIGS. 4 to 13.

Figure 4:
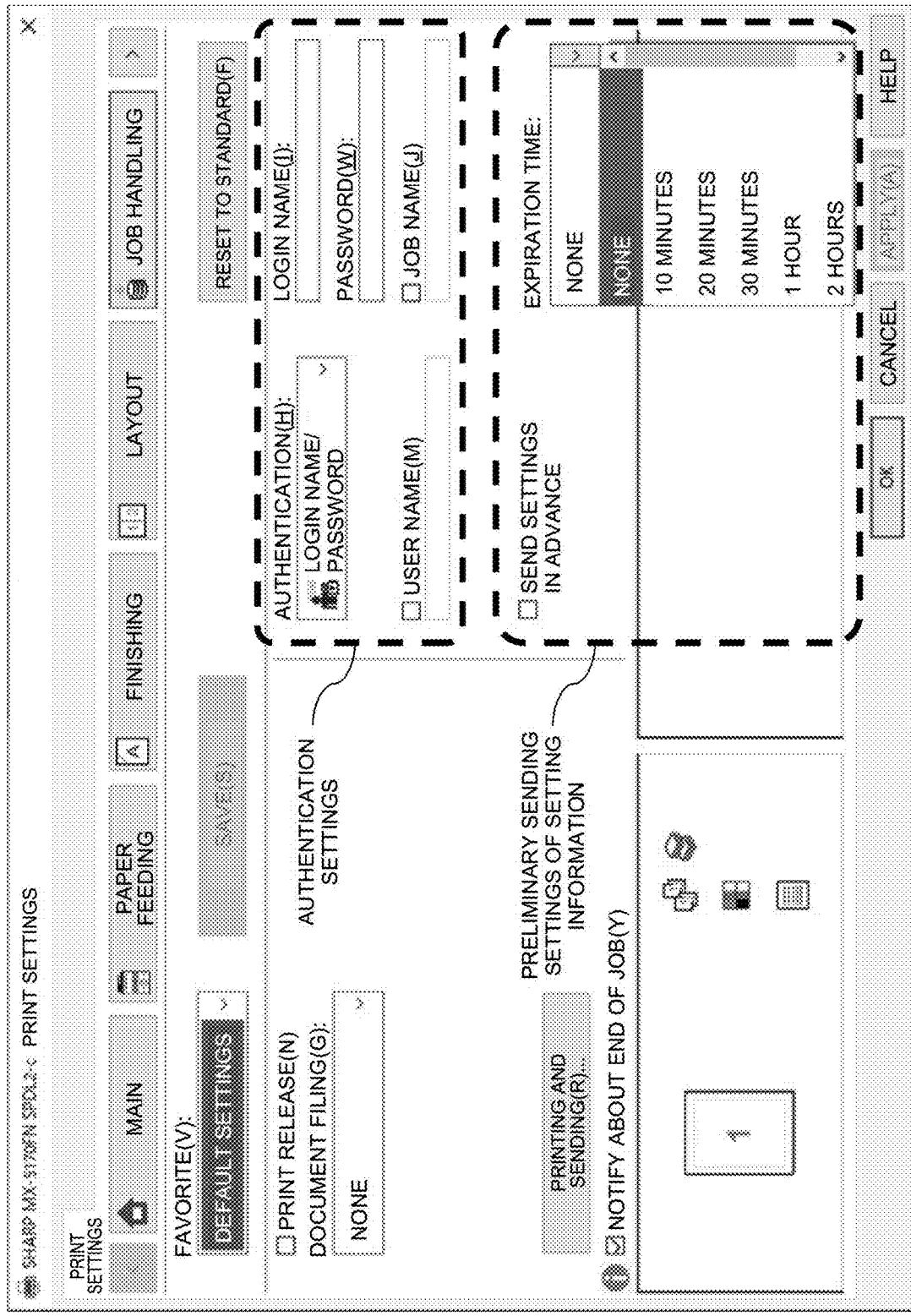
FIG. 4 is an explanatory diagram illustrating an example of a setting screen of a printer driver displayed on a display of the user terminal illustrated in FIG. 1.

FIG. 4 is an explanatory diagram illustrating an example of a setting screen of a printer driver displayed on the display 24 of the user terminal 2 illustrated in FIG. 1.

One method of transmitting preliminary setting information from the user terminal 2 to the digital multifunction machine 1 is to use the printer driver for the digital multifunction machine 1 installed in the user terminal 2.

As illustrated in FIG. 4, after setting a print job sent in advance by checking the "Send settings in advance" item in the lower right corner of the setting screen of the printer driver, setting the expiration time and period, etc., and then pressing the "OK" button, these settings can be used to print the image data received through a user operation.

Figure 5:
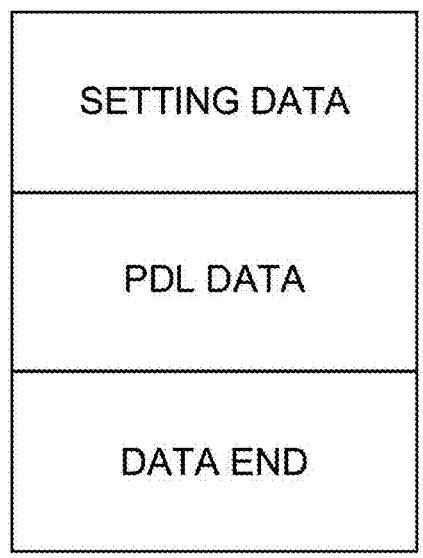
FIG. 5 is an explanatory diagram illustrating an outline of a data structure of a print job for the digital multifunction machine illustrated in FIG. 1.

FIG. 5 is an explanatory diagram illustrating an outline of a data structure of a print job of the digital multifunction machine 1 illustrated in FIG. 1.

As illustrated in FIG. 5, the data structure of a print job consists of setting data, PDL data, and data end.

FIG. 6 is an explanatory diagram illustrating an example of usual print job data of the digital multifunction machine 1 illustrated in FIG. 1.

In the example in FIG. 6, "@PJL JOB NAME" is set to a file name, such as "quatation.xlsx". "@PJL SET PRESET=OFF" is set, the PDL data (binary data) representing the image to be actually printed follows the setting data part (line with @PJL, character code data), and the data end "@PJL EOJ" is placed at the end.

FIG. 7 is an explanatory diagram illustrating an example of print job data of the digital multifunction machine 1 of when the "Send settings in advance" checkbox is checked on the setting screen of the printer driver on the display 24 of the user terminal 2 illustrated in FIG. 1.

In the example in FIG. 7, "@PJL JOB NAME" is set to "Preliminary settings". "@PJL SET PRESET=ON" is set, the PDL data portion is not present, and the data end "@PJL EOJ" is placed at the end.

In the example in FIG. 4, the expiration time can be selected as "none", "10 minutes", "20 minutes", "30 minutes", "1 hour", "2 hours", or any other duration.

FIG. 8 is an explanatory diagram illustrating an example of print job data of a digital multifunction machine 1 of when the expiration time is set to "10 minutes" on the setting screen of the printer driver displayed on the display 24 of the user terminal 2 illustrated in FIG. 1.

In the example in FIG. 8, "@PJL SET EXPIRATION=10 min".

If there is no explicit expiration time set by the preliminary setting information (i.e., no "@PJL SET EXPIRATION=xx"), the digital multifunction machine 1 may be set to operate with a default value (e.g., 3 minutes) as the expiration time. In this case, the controller executes a process with a three-minute expiration time in the determination of step S20 in FIG. 11 below.

Figure 9:
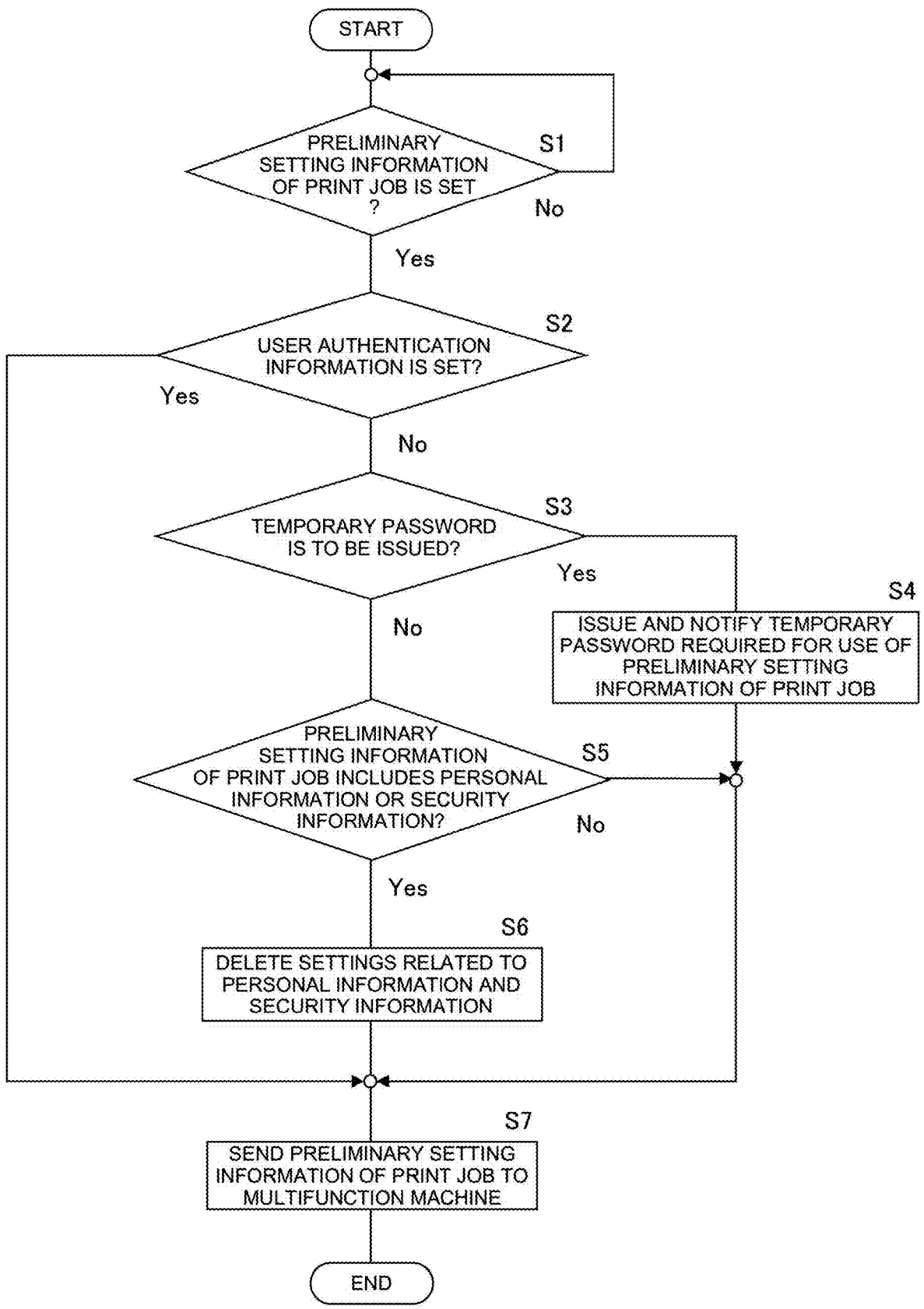
FIG. 9 is a flowchart illustrating a transmission process of preliminary setting information of a print job established in the printer driver of the user terminal illustrated in FIG. 1.

FIG. 9 is a flowchart illustrating a transmission process of preliminary setting information of a print job for the user terminal 2 illustrated in FIG. 1.

In step S1 of FIG. 9, the controller 20 of the user terminal 2 determines whether or not the preliminary setting information for a print job has been set in the printer driver (step S1).

In step S1, if the preliminary setting information of the print job has been set (if the determination in step S1 is Yes), in step S2, the controller 20 determines whether or not user authentication information has been set (step S2).

When the authentication mode is set, the print job data illustrated in FIG. 6 includes "LOGINID" and "PASSWORD" information, as indicated by "@PJL SET LOGINID="ID7654321" and "@PJL SET PASSWORD="j8WCeB8uivBfcgXaNxQ1aA=="". If the authentication mode is not set, "LOGINID" and "PASSWORD" information is not included.

As in the example in FIG. 4, if "Login Name/Password" is selected as the "Authentication" setting for the printer driver, the user will need to input a "login name" and a "password".

If the user authentication information is set (if the determination in step S2 is Yes), in step S7, the controller 20 causes the digital multifunction machine 1 to transmit the preliminary setting information of the set print job (step S7), and the process ends.

If no user authentication information is set (if the determination in step S2 is No), in step S3, the controller 20 determines whether or not to issue a temporary password (step S3).

For example, if the printer driver in FIG. 4 allows the user to select an item such as "Issue temporary password" as a selection item for the "Authentication" setting, when the user presses the "OK" button, a temporary password is issued and the user is notified.

If a temporary password is issued (if the determination in step S3 is Yes), in step S4, the controller 20 issues the temporary password required to use the preliminary setting information of the set print job and causes the display 24 to display a notification (step S4).

If the settings are such that the temporary password is to be issued without setting the authentication mode, the print job data in FIG. 6 does not include the "LOGINID" information but includes the information "@PJL SET PASSWORD="(temporary password)"".

Then, in step S7, the controller 20 causes the digital multifunction machine 1 to transmit the preliminary setting information of the set print job (step S7), and the process ends.

If a temporary password is not issued (if the determination in step S3 is No), in step S5, the controller 20 determines whether or not the preliminary setting information of the set print job includes personal information, such as destination, or security information (step S5).

If the preliminary setting information of the set print job does not include personal information, such as the destination, or security information (if the determination in step S5 is No), in step S7, the controller 20 causes the preliminary setting information of the set print job to be transmitted to the digital multifunction machine 1 (step S7), and the process ends.

If the preliminary setting information of the set print job includes personal information, such as the destination, or security information (if the determination in step S5 is Yes), in step S6, the controller 20 deletes the settings related to personal information or security information (step S6).

FIG. 10 is an explanatory diagram illustrating an example of print job data in which settings regarding personal information or security information have been deleted when personal information, such as the destination, or security information is included in the preliminary setting information for a print job of the digital multifunction machine 1 illustrated in FIG. 1.

In the example in FIG. 10, "@PJL SET ADRS=1683852091780_0.com" pertaining to personal information is deleted.

Then, in step S7, the controller 20 causes the digital multifunction machine 1 to transmit the preliminary setting information of the set print job (step S7), and the process ends.

Figure 11:
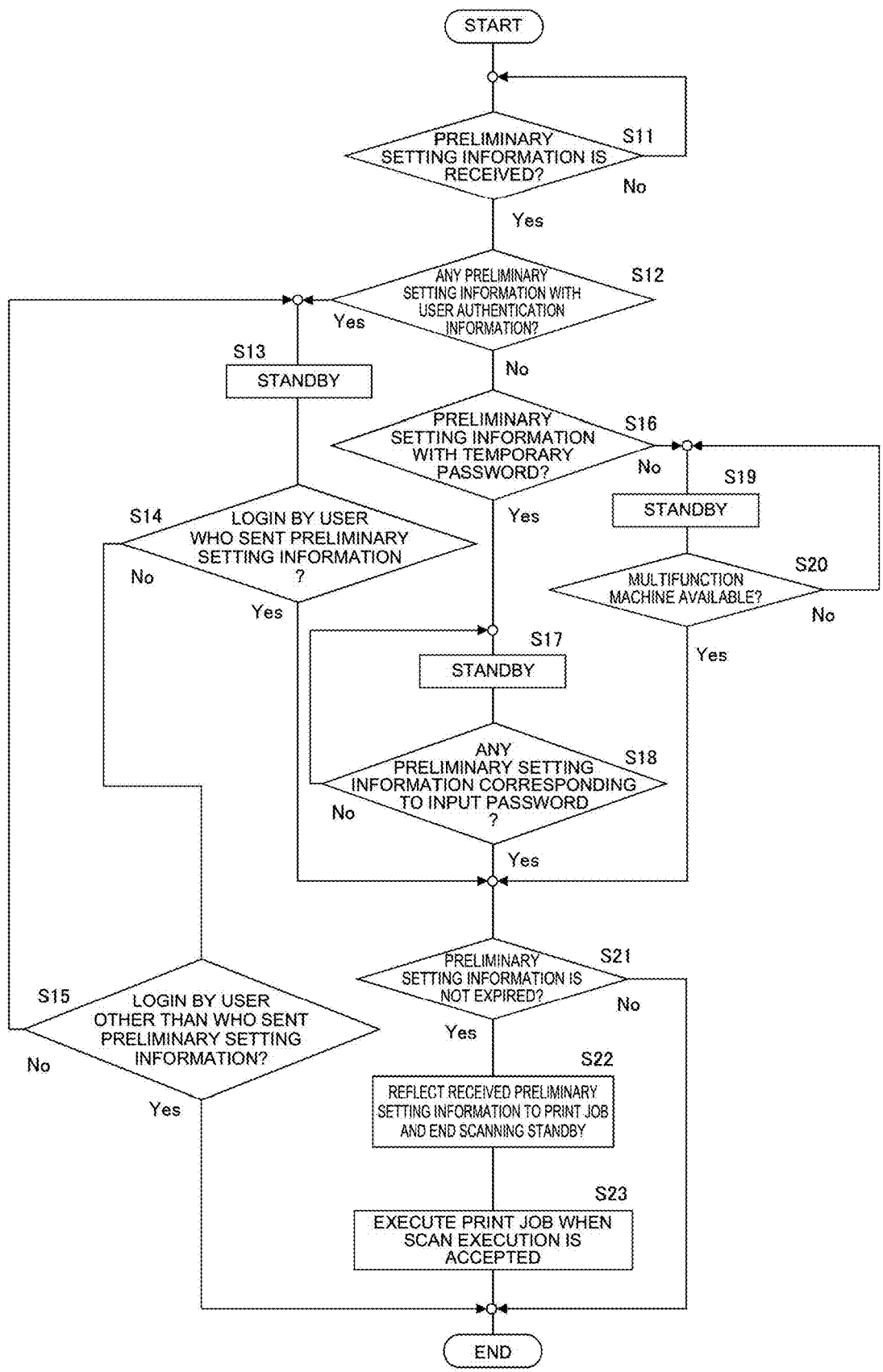
FIG. 11 is a flowchart illustrating a process executed after reception of preliminary setting information of a print job of the digital multifunction machine illustrated in FIG. 1.

FIG. 11 is a flowchart illustrating a process executed after reception of the preliminary setting information of a print job of the digital multifunction machine 1 illustrated in FIG. 1.

In step S11 in FIG. 11, the controller 10 of the digital multifunction machine 1 determines whether or not the communicator 15 has received the preliminary setting information (step S11).

If the communicator 15 has received the preliminary setting information (if the determination in step S11 is Yes), in step S12, the controller 10 determines whether or not user authentication information has been set in the preliminary setting information (step S12).

If user authentication information is set in the preliminary setting information (if the determination in step S12 is Yes), in step S13, the controller 10 waits until there is a login by the user who transmitted the preliminary setting information (step S13).

In the subsequent step S14, the controller 10 determines whether or not the user who transmitted the preliminary setting information has logged in (step S14).

If there is no login by the user who transmitted the preliminary setting information (if the determination in step S14 is No), in step S15, the controller 10 determines whether or not there was a login by a user other than the user who transmitted the preliminary setting information (step S15).

If a user other than the user who transmitted the preliminary setting information logs in (if the determination in step S15 is Yes), the controller 10 ends the process and transitions to control to accept user operations for usual various functions (not related to pre-settings) of the digital multifunction machine 1 via a displayed initial screen.

If no user other than the user who transmitted the preliminary setting information logs in (if the determination in step S15 is No), the controller 10 causes the process to return to step S13.

In the determination in step S14, if the user who transmitted the preliminary setting information has logged in (if the determination in step S14 is Yes), in step S21, the controller 10 determines whether or not the preliminary setting information is within the expiration time (step S21).

If the preliminary setting information is not within the expiration time (if the determination in step S21 is No), the controller 10 ends the process and transitions to control to accept user operations for usual various functions (not related to pre-settings) of the digital multifunction machine 1 via a displayed initial screen. In this case, the controller 10 may indicate on the display 161 that the preliminary setting information has expired. The controller 10 may delete the expired preliminary setting information from the storage 13.

If the preliminary setting information is not expired (if the determination in step S21 is Yes), in step S22, the controller 10 reflects the received preliminary setting information in the print job and causes the image former 12 to stand by for scanning (step S22).

Figure 12:
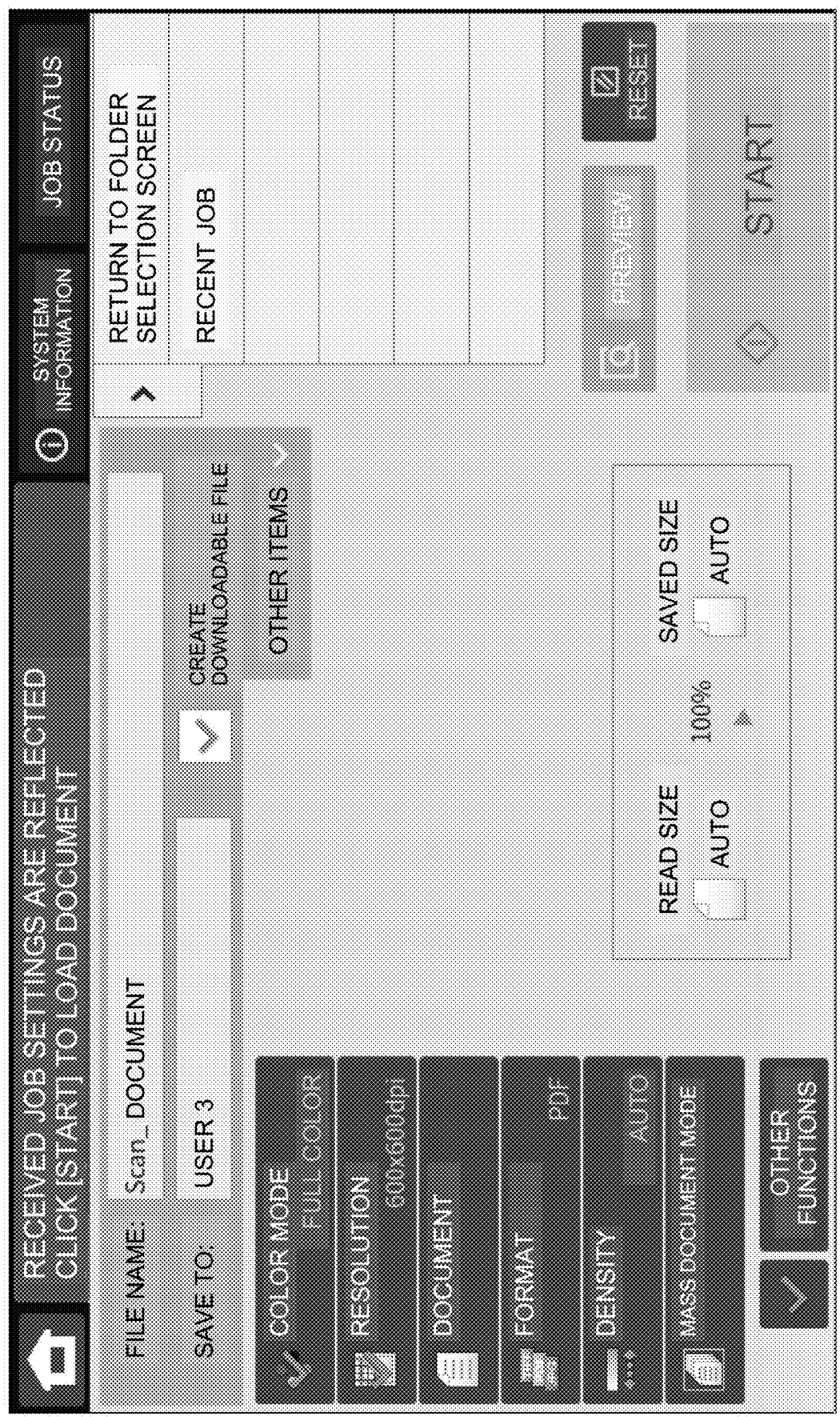
FIG. 12 illustrates an example of a print setting screen displayed on the display when a user logs in after the digital multifunction machine illustrated FIG. 1 receives preliminary setting information from a user terminal.

FIG. 12 illustrates an example of a print setting screen displayed on the display 161 when the user logs in after the digital multifunction machine 1 illustrated FIG. 1 receives the preliminary setting information from the user terminal 2.

As illustrated in FIG. 12, after a user logs, the message field at the top of the print setting screen in displays a message "Received job settings are reflected. Click [Start] to load document", and it is apparent that the preliminary setting information received in advance from user terminal 2 is reflected.

Next, in step S23 of FIG. 11, if the execution of scanning is accepted by the user, the controller 10 causes the image former 12 to execute a print job reflecting the preliminary setting information (step S23), and the process ends.

If the preliminary setting information is accepted from two users 1 and 2, the controller 10 cannot immediately accept the preliminary setting information from the later user 2.

However, if (1) a print job to which the preliminary setting information of the former user 1 is applied is executed, (2) the preliminary setting information of the former user 1 expires, or (3) the preliminary setting information of the former user 1 is canceled, it is assumed that the controller 10 accepts the preliminary setting information of the later user 2.

If no user authentication information is set in the received preliminary setting information in step S12 of FIG. 11 (if the determination in step S12 is No.), in step S16, the controller 10 determines whether or not a temporary password is set in the preliminary setting information (step S16).

If a temporary password is set in the preliminary setting information (if the determination in step S16 is Yes), in step S17, the controller 10 waits until there is a login to the user terminal by the user who transmitted the preliminary setting information (step S17).

In a subsequent step S18, the controller 10 determines whether or not there is preliminary setting information corresponding to the password input by the user (step S18).

If the preliminary setting information corresponding to the inputted password exists (if the determination in step S18 is Yes), the controller 10 makes a determination in step S20.

If no temporary password is set in the preliminary setting information in step S16 (if the determination in step S16 is No), if in step S19, the controller 10 waits until the digital multifunction machine 1 is ready for use (step S19).

The "state in which digital multifunction machine 1 is available" is, for example, when a user touches the operation panel 16 of the digital multifunction machine 1 to wake it from sleep mode and put it in a state to accept operations. In this case, even if the user is not logged in, it is sufficient that the user has authority to use the digital multifunction machine 1 as a guest user.

In the subsequent step S20, the controller 10 determines whether or not the digital multifunction machine 1 is available (step S20).

If the digital multifunction machine 1 is available (if the determination in step S20 is Yes), the controller 10 makes the determination in step S21.

Figure 13:
FIG. 13 illustrates an example of a print setting screen displayed on the display after the digital multifunction machine illustrated in FIG. 1 receives, from a user terminal, preliminary setting information in which user authentication is not set.

FIG. 13 illustrates an example of a print setting screen displayed on the display 161 after the digital multifunction machine 1 illustrated in FIG. 1 receives, from the user terminal 2, preliminary setting information in which user authentication is not set.

As illustrated in FIG. 13, the message field at the top of the print setting screen displays a message "Received job settings are reflected. Click [Start] to load document." is displayed, and it is apparent that the preliminary setting information received in advance from user terminal 2 is reflected.

The expiration time "(Valid until 10:30 on 1/15/2022)" pops up together with the message "Job settings received from remote user are reflected".

Moreover, the "OK" and "Cancel" buttons are displayed together with the message "If settings are not used, click [Cancel] to return to home screen.", and the user can freely select whether or not the preliminary setting information is to be reflected.

In this way, when a user uses the digital multifunction machine 1 after preliminary setting information is sent from the user terminal 2 to the digital multifunction machine 1 in advance, if the preliminary setting information is not expired, the image forming system 100 transitions to the standby state for image data acquisition, and the preliminary setting information is reflected to the print job for the image based on the acquired image data. Therefore, it is possible to realize the image forming system 100 such that it reduces the user's operational burden and increases convenience in print job settings of the digital multifunction machine 1.

Second Embodiment

Transmission/reception Process of Preliminary Setting Information of Print Job of Image Forming System 100 According to Second Embodiment Transmission and reception processes of preliminary setting information of a print job for the image forming system 100 according to the second embodiment of the disclosure will now be explained with reference to FIGS. 14 to 20.

The schematic configuration of the image forming system 100 according to the second embodiment is similar to that of the first embodiment (FIGS. 1 to 3) and thus, a description thereof is not repeated.

Figure 14:
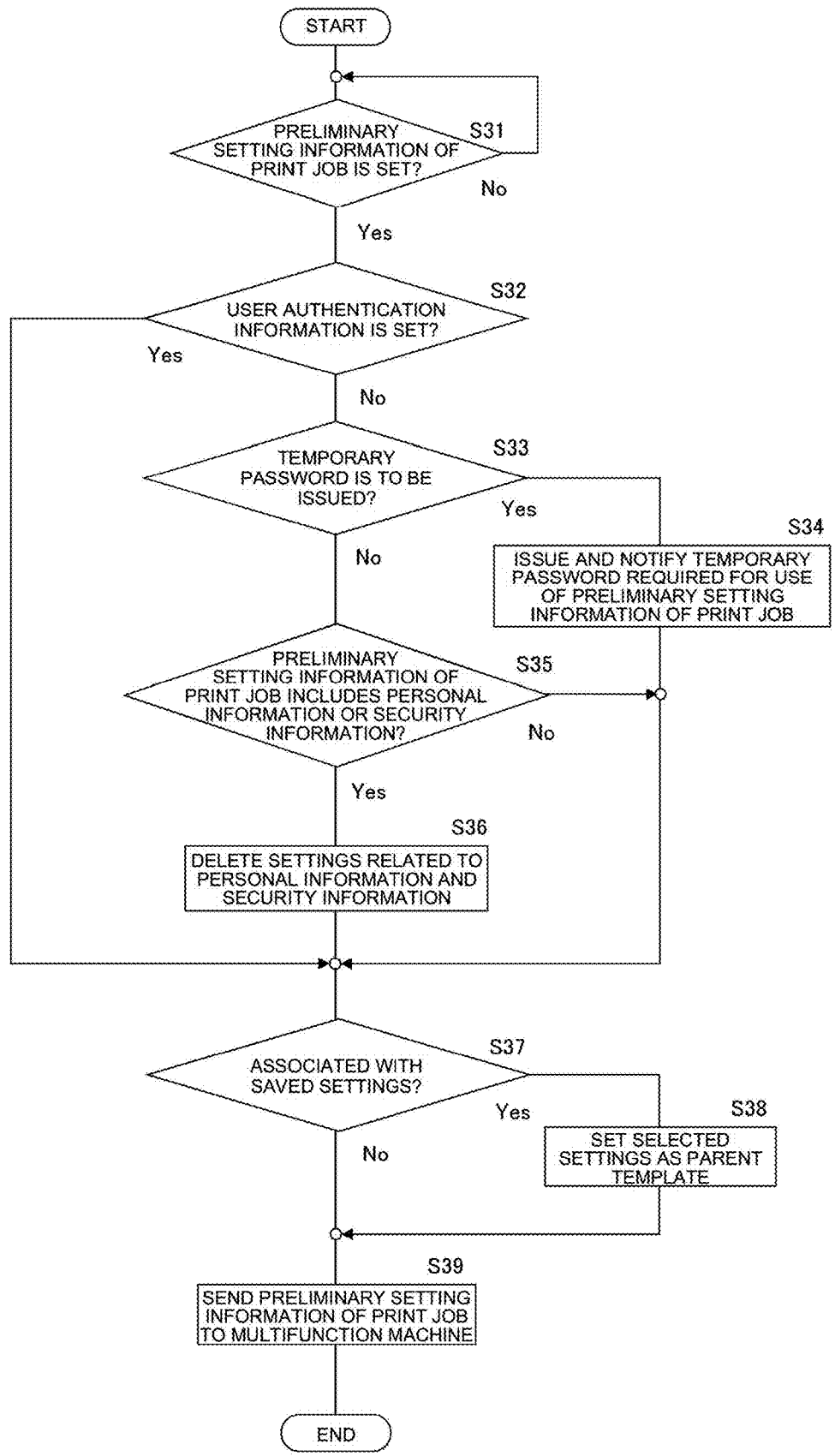
FIG. 14 is a flowchart illustrating a transmission process of preliminary setting information of a print job established in a printer driver of a user terminal in an image forming system illustrated according to a second embodiment of the disclosure.

FIG. 14 is a flowchart illustrating a transmission process of preliminary setting information of a print job established in a printer driver of a user terminal 2 in an image forming system 100 illustrated according to the second embodiment of the disclosure.

Since steps S31 to S36 and S39 illustrated in FIG. 14 respectively correspond to steps S1 to S7 illustrated in FIG. 9 (the first embodiment), explanations thereof will not be repeated.

After the settings related to personal information and security information are deleted in step S36 of FIG. 14 (step S36), in step S37, the controller 20 determines whether or not an association with the settings already saved in the storage 13 of the digital multifunction machine 1 is established (step S37).

Figure 15:
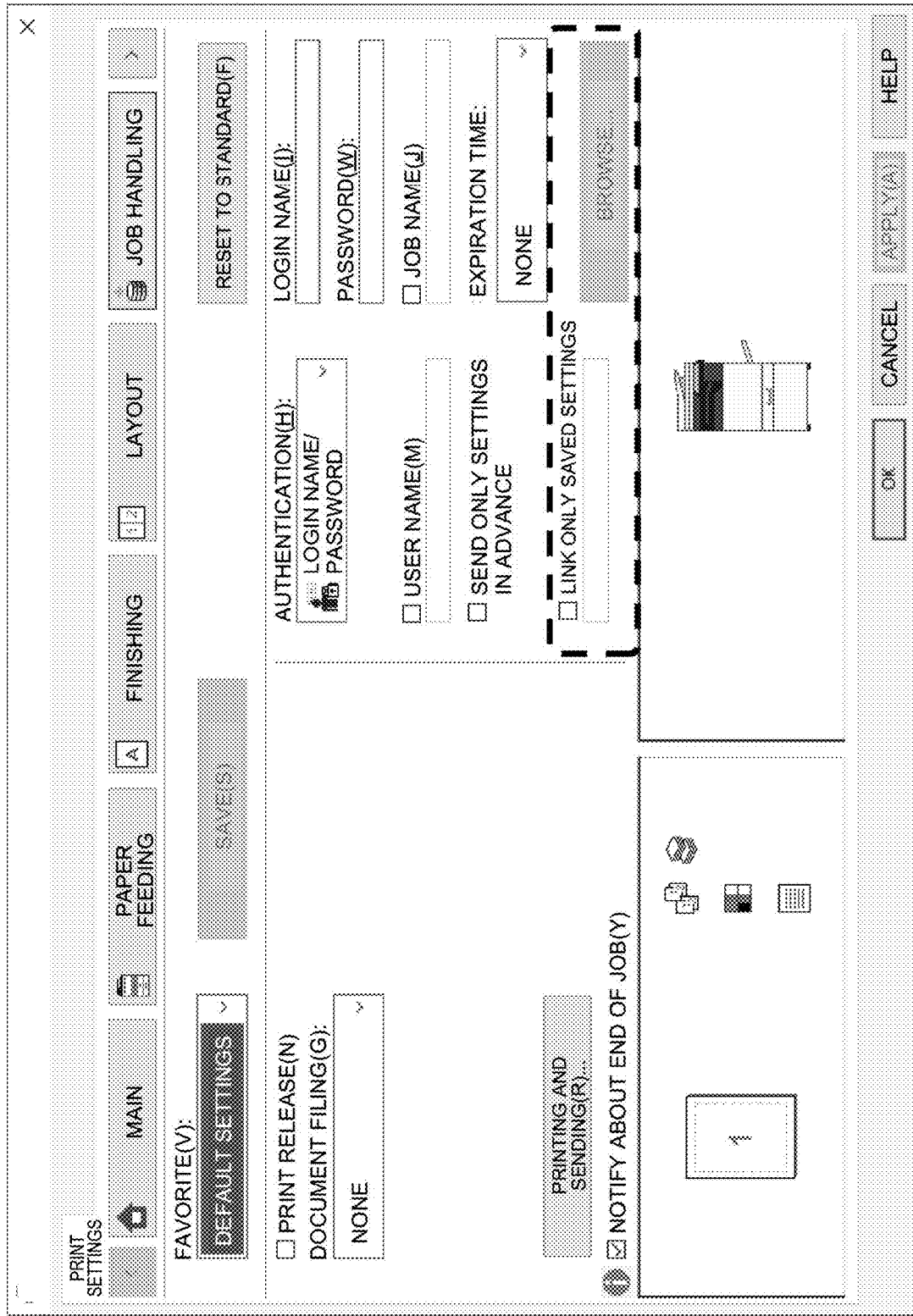
FIG. 15 is an explanatory diagram illustrating an example of a setting screen of a printer driver displayed on a display of a user terminal in the image forming system according to the second embodiment of the disclosure.

FIG. 15 is an explanatory diagram illustrating an example of a setting screen of a printer driver displayed on a display 24 of a user terminal 2 in the image forming system 100 according to the second embodiment of the disclosure.

In the area enclosed by the dashed line in FIG. 15, the user can check the "Link only saved settings" item and select the saved setting to be referenced to establish an association with saved settings.

If the association with the settings stored in the storage 13 of the digital multifunction machine 1 is established (if the determination of step S37 is Yes), in step S38, the controller 20 makes the setting selected by the user the parent template (step S38).

Then, in step S39, the controller 20 causes the digital multifunction machine 1 to transmit the preliminary setting information of the set print job (step S39), and the process ends.

If the association with the saved settings is not established in the storage 13 of the digital multifunction machine 1 (if the determination in step S37 is No), the controller 20 executes the process in step S39.

Figure 16:
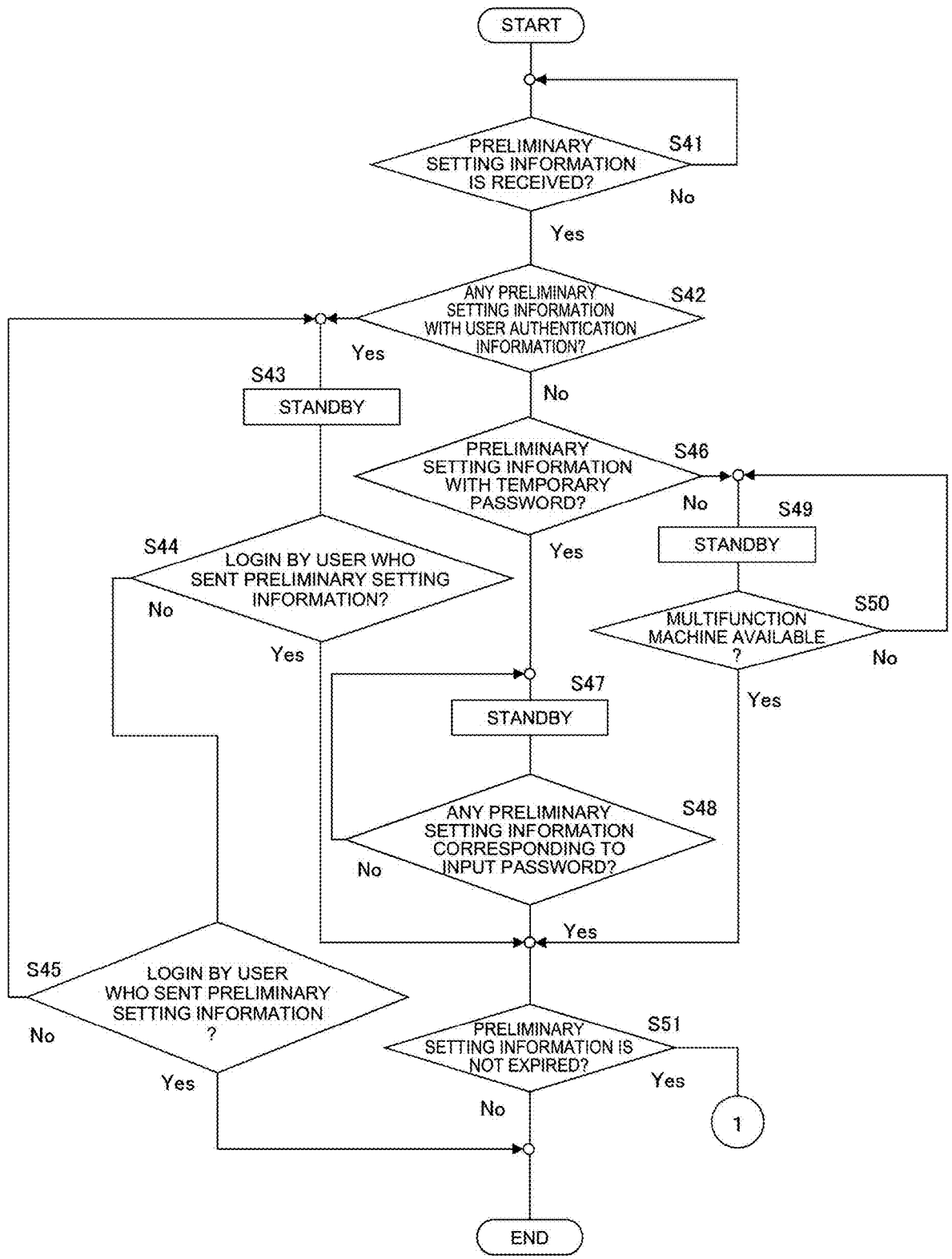
FIG. 16 is a flowchart illustrating a process after reception of preliminary setting information of a print job for a digital multifunction machine in the image forming system according to the second embodiment of the disclosure.
Figure 17:
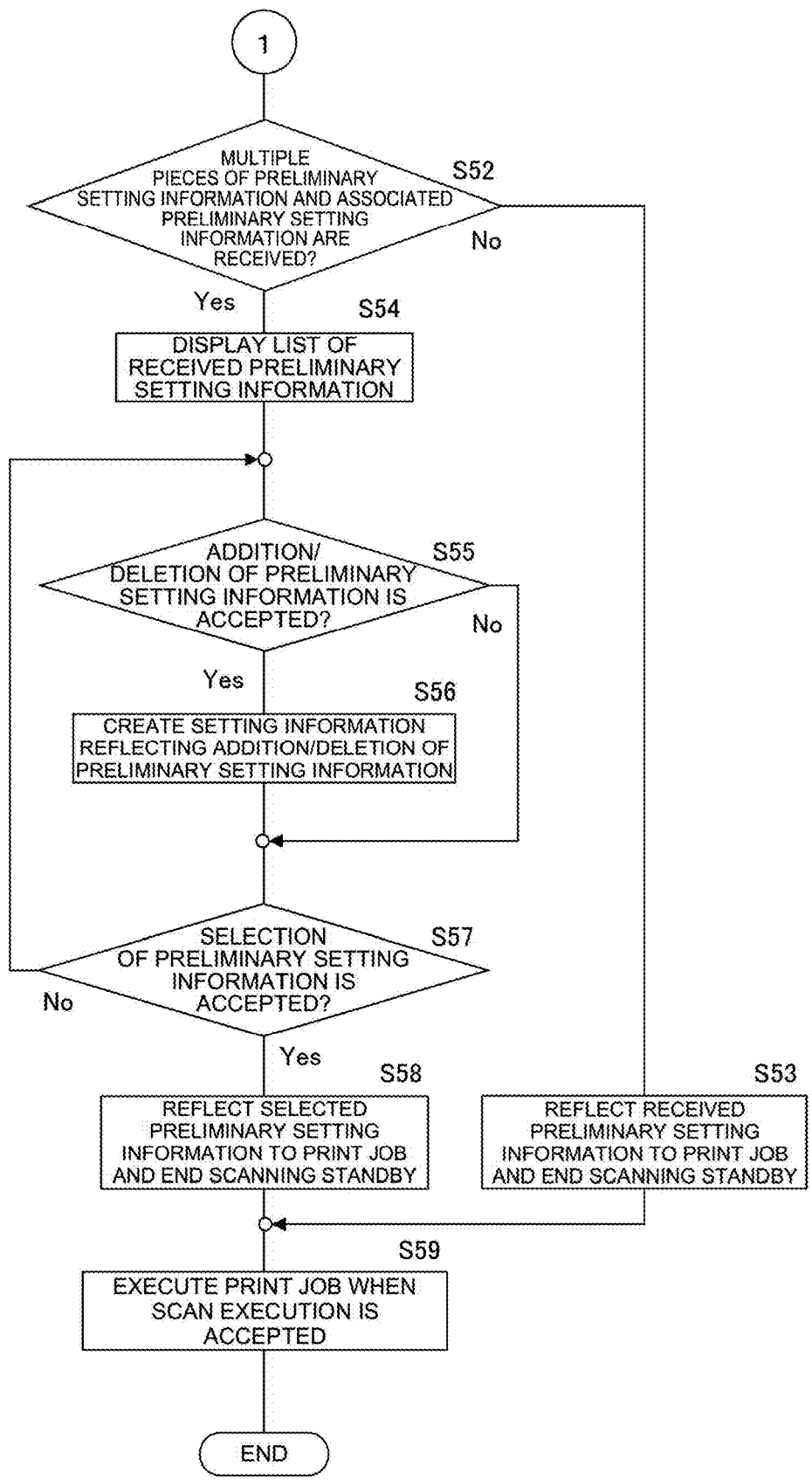
FIG. 17 is a flowchart illustrating a process after reception of preliminary setting information of a print job for a digital multifunction machine in the image forming system according to the second embodiment of the disclosure.

FIGS. 16 and 17 are flowcharts illustrating a process after reception of preliminary setting information of a print job for the digital multifunction machine 1 in the image forming system 100 according to the second embodiment of the disclosure.

Since steps S41 to S51 illustrated in FIG. 16 respectively correspond to steps S11 to S21 illustrated in FIG. 11 (the first embodiment), explanations thereof will not be repeated.

Here, the process of steps S52 to S59 in FIG. 17 is explained.

In step S51 in FIG. 16, if the received preliminary setting information is not expired (if the determination in step S51 is Yes), in step S52 in FIG. 17, the controller 10 determines whether or not multiple pieces of preliminary setting information or associated preliminary setting information have been received (step S52).

If multiple pieces of preliminary setting information or associated preliminary setting information are not received (if the determination in step S52 is No), in step S53, the controller 10 reflects the received preliminary setting information in the print job and causes the image former 12 to stand by for scanning (step S53).

Next, in step S59, if the execution of scanning is accepted by the user, the controller 10 causes the image former 12 to execute a print job reflecting the preliminary setting information (step S59), and the process ends.

In step S52, if multiple pieces of preliminary setting information or associated preliminary setting information are received (if the determination in step S52 is Yes), in step S54, the controller 10 causes the display 161 to display a list of received preliminary setting information (step S54).

FIG. 18 is an example of a selection screen of a print setting list displayed on the display 161 of the digital multifunction machine 1 in the image forming system 100 according to the second embodiment of the disclosure.

If the digital multifunction machine 1 has received multiple pieces of preliminary setting information or associated preliminary setting information at the time of the user's login, a list of preliminary setting information is displayed, as illustrated in FIG. 18.

In the example in FIG. 18, "Template 1, expiration date 2022/03/31" and "Template 3, no expiration date" are displayed as the "list of setting templates".

Also displayed are "Template 2, no expiration date", which is a difference template with the template 1 as the parent template, and "Template 4, expiration date 2022/01/31" and "Template 5, no expiration date", which are difference templates with the template 3 as the parent template.

Next, in step S55 of FIG. 17, the controller 10 determines whether or not the addition or deletion of preliminary setting information has been accepted (step S55).

If no addition or deletion of preliminary setting information is accepted (if the determination in step S55 is No), the controller 10 make a determination in step S57.

If the addition or deletion of preliminary setting information is accepted (if the determination in step S55 is Yes), in step S56, the controller 10 creates setting information reflecting the addition or deletion of the preliminary setting information (step S56).

As illustrated in the example in FIG. 18, the user can check the "Add" checkbox for the difference template 2 for the parent template 1 and click the "Register" button to add settings to the parent template 1.

FIG. 19 is a table showing an example of new preliminary setting information created by adding settings of difference templates while using, as the parent template, the preliminary setting information saved in the storage 13 of the digital multifunction machine 1 in the image forming system 100 according to the second embodiment of the disclosure.

As illustrated in FIG. 19, items such as "Color Mode", "Resolution", "Document", "Format", "Destination", "User Name", "Attributes", "Density", "Contrast", and "Download File Creation" can be established.

In the example in FIG. 19, the settings of template 1<Parent Template> are as follows: "Color Mode: Color", "Destination: Folder 1", "Contrast: Auto", and "Download File Creation: ON".

The setting of the template 2<difference> are as follows: "Resolution: 600×600", "Format: TIFF", "User Name: User 1", "Attribute: Shared", and "Density: Print Photograph".

In this case, if the "Add" checkbox is checked for template 2 in FIG. 18, the settings reflected will be those of the templates 1 and 2 combined. Items for which nothing is specified are default settings.

In the example in FIG. 19, the settings reflected are as follows: "Color Mode: Color", "Resolution: 600×600", "Document: Auto (Default)", "Format: TIFF", "Destination: Folder 1", "User Name: User 1", "Attribute: Shared", "Density: Print Photograph", "Contrast: Auto", and "Download File Creation: ON".

As illustrated in the example in FIG. 18, the user can check the "Delete" checkbox for the difference template 4 for the parent template 3 and click the "Register" button to delete settings to the parent template 3.

FIG. 20 is a table showing an example of new preliminary setting information created by deleting settings of difference templates while using, as the parent template, the preliminary setting information saved in the storage 13 of the digital multifunction machine 1 in the image forming system 100 according to the second embodiment of the disclosure.

In the example in FIG. 20, the template 3<parent template> is set as follows: "Color Mode: Color", "Resolution: 600×600", "Format: TIFF", "Destination: Folder 1", "User Name: User 1", "Attribute: Shared", "Density: Print Photograph", "Contrast: Auto", "Download File Creation: ON".

The template 4<difference> is set as follows: "Resolution: 200×200", "Destination: TEMP", "Density: Auto", and "Download File Creation: OFF".

In this case, if the "Delete" checkbox is checked in the difference template, the settings reflected will be the settings in which the items set in the difference template are deleted from the parent template. Here, items deleted from the parent template return to their default settings. Items for which nothing is specified are default settings.

In the example in FIG. 20, the settings reflected are as follows: "Color Mode: Color", "Resolution: Auto (Default)", "Document: Auto (default)", "Format: TIFF", "Destination: Standard Folder (Default)", "User Name: User 1", "Attribute: Shared", "Density: Auto (Default)", "Contrast: Auto", and "Download File Creation: OFF".

Next, in step S57 of FIG. 17, the controller 10 determines whether or not the selection of preliminary setting information has been accepted (step S57).

If no selection of preliminary setting information is accepted (if the determination in step S57 is No), the controller 10 returns to the process to in step S55 for determination.

If the selection of preliminary setting information is accepted (if the determination in step S57 is Yes), in step S58, the controller 10 reflects the received preliminary setting information in the print job and causes the image former 12 to stand by for scanning (step S58).

Next, the controller 10 causes the image former 12 to execute a print job reflecting the preliminary setting information (step S59), and the process ends.

In this way, when the preliminary setting information for a print job is transmitted in advance from the user terminal 2 to the digital multifunction machine 1, additional settings or deleted settings can be reflected to the already saved settings. Therefore, it is possible to realize the image forming system 100 such that it reduces the user's operational burden and increases convenience in print job settings of the digital multifunction machine 1.

Third Embodiment

Settings of Preliminary Setting Information of Print Job of Image Forming System 100 According to Third Embodiment The settings of preliminary setting information of a print job for the image forming system 100 according to the third embodiment of the disclosure will now be explained with reference to FIGS. 21 to 22.

The schematic configuration of the image forming system 100 according to the third embodiment is similar to that of the first embodiment (FIGS. 1 to 3) and thus, a description thereof is not repeated.

FIG. 21 is an example of a selection screen of a print setting list displayed on the display 161 of the digital multifunction machine 1 in the image forming system 100 according to the third embodiment of the disclosure.

In the list of preliminary setting information in FIG. 21, there is a "Delete After Printing" item that allows deletion of the settings after printing and a "Create New Template" item.

As illustrated in FIG. 21, the user can create a new template by checking the "Create New Template" item, setting "New Template Name: Template 6" and clicking the "Register" button.

FIG. 22 is a table showing an example of new preliminary setting information created by prioritizing settings of difference templates while using, as the parent template, the preliminary setting information saved in the storage of the digital multifunction machine 1 in the image forming system 100 according to the third embodiment of the disclosure.

In the example in FIG. 22, the template 1<parent template> is set as follows: "Color Mode: Color", "Format: TIFF", "Destination: Folder 1", "User Name: User 1", "Attribute: Shared", "Density: Print Photograph", "Contrast: Auto", "Download File Creation: ON".

The template 2<difference> is set as follows: "Resolution: 200×200", "Destination: TEMP", "Density: Auto", and "Download File Creation: OFF".

In this case, if the "Priority" checkbox is checked in the difference template, the settings reflected will be the settings in which the items set in the difference template are prioritized over the parent template. Items for which nothing is specified are default settings.

In the example in FIG. 22, the settings reflected are as follows: "Color Mode: Color", "Resolution: 200×200", "Document: Auto (Default)", "Format: TIFF", "Destination: TEMP", "User Name: User 1", "Attribute: Shared", "Density: Auto", "Contrast: Auto", and "Download File Creation: OFF".

On the basis of the settings in FIG. 21, in the newly created template, the difference template 2 saved as the template 6 is deleted.

In this way, when the preliminary setting information for a print job is transmitted in advance from the user terminal 2 to the digital multifunction machine 1, priority settings can be reflected to the already saved settings. Therefore, it is possible to realize the image forming system 100 such that it reduces the user's operational burden and increases convenience in print job settings of the digital multifunction machine 1.

Fourth Embodiment

Settings of Preliminary Setting Information of Print Job of Image Forming System 100 According to Fourth Embodiment The settings of preliminary setting information of a print job for the image forming system 100 according to the fourth embodiment of the disclosure will now be explained with reference to FIGS. 23 to 24.

The schematic configuration of the image forming system 100 according to the third embodiment is similar to that of the fourth embodiment (FIGS. 1 to 3) and thus, a description thereof is not repeated.

Figure 23:
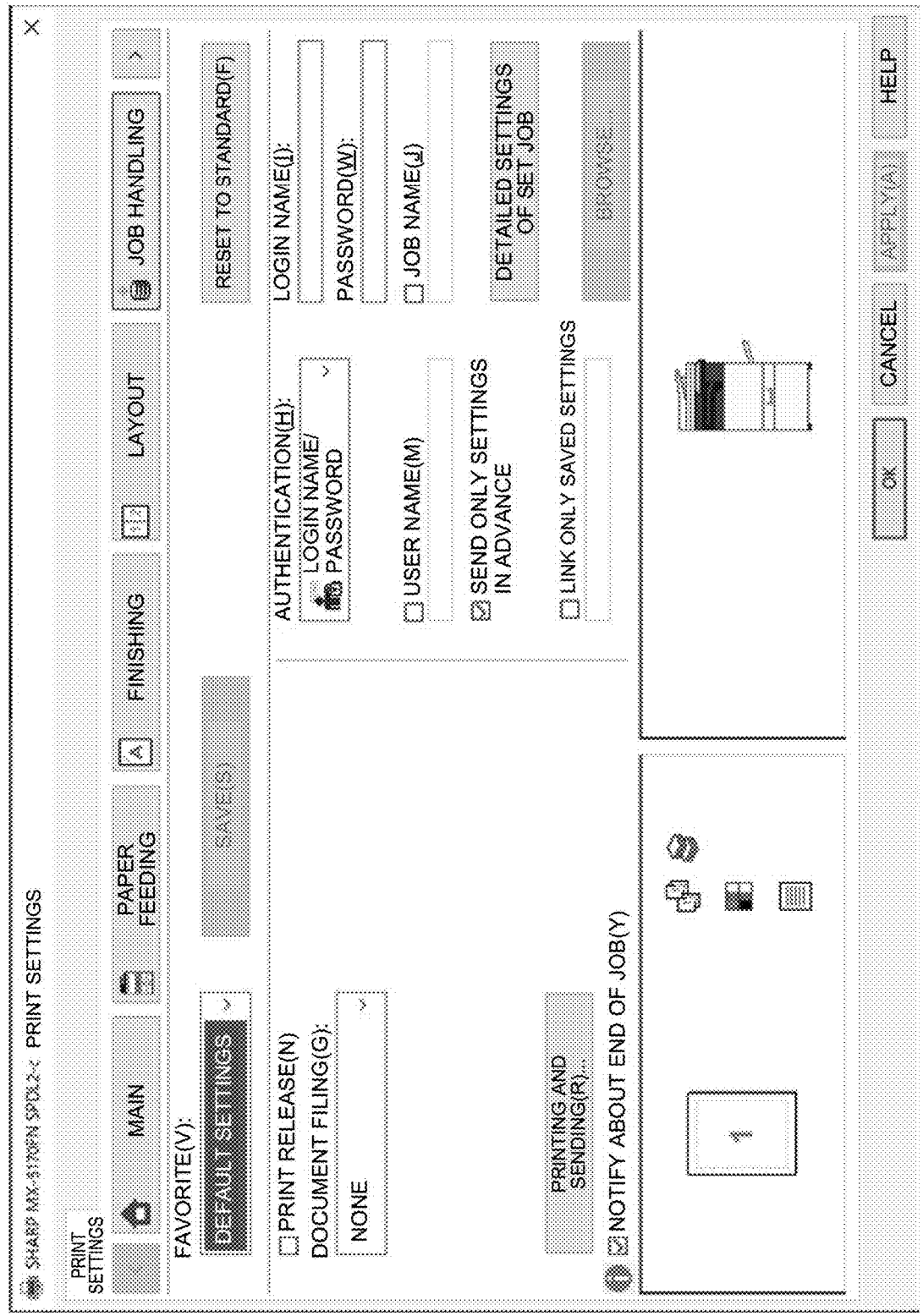
FIG. 23 is an explanatory diagram illustrating an example of a setting screen of a printer driver displayed on a display of a user terminal in an image forming system according to a fourth embodiment of the disclosure.

FIG. 23 is an explanatory diagram illustrating an example of a setting screen of a printer driver displayed on a display 24 of a user terminal 2 in the image forming system 100 according to the fourth embodiment of the disclosure.

As illustrated in FIG. 23, when a user selects "Detailed Settings of Set Job", the user can specify the type of job and the settings for each job.

FIG. 24 is an explanatory diagram illustrating an example of a detailed setting screen of a print job for a printer driver displayed on a display 24 of a user terminal 2 in the image forming system 100 according to the fourth embodiment of the disclosure.

In the example in FIG. 24, the "Job Type" may be selected from jobs such as "Scan Save", "Fax", "E-mail", "Shared Folder", etc.

For example, as illustrated in FIG. 24, when "Save Scan" is selected, settings can be established by checking the "Destination", "Attributes", "User Name", and "Password" items.

When "E-mail" is selected, an E-mail may be retrieved from the address book stored in the storage 13 of the digital multifunction machine 1.

In this way, when the preliminary setting information for a print job is transmitted in advance from the user terminal 2 to the digital multifunction machine 1, settings for job type or for each job can also be reflected. Therefore, it is possible to realize the image forming system 100 such that it reduces the user's operational burden and increases convenience in print job settings of the digital multifunction machine 1.

Fifth Embodiment

Settings of Preliminary Setting Information of Print Job of Image Forming System 100 According to Fifth Embodiment The settings of preliminary setting information of a print job for the image forming system 100 according to the fifth embodiment of the disclosure will now be explained with reference to FIG. 25.

In the first embodiment, FIG. 7 illustrates an example in which the PDL data part is removed from the print job data when the "Send Settings in Advance" checkbox is checked in the setting screen of the printer driver displayed in the display 24 of the user terminal 2 illustrated in FIG. 1.

In contrast, in the fifth embodiment, the PDL data part of the print job may remain because it is sufficient to accept the image data to be printed after the preliminary settings are accepted.

FIG. 25 is an explanatory diagram illustrating an example data of a print job for a digital multifunction machine 1 in the image forming system 100 according to the fifth embodiment of the disclosure.

Specifically, as illustrated in FIG. 25, "@PJL SET PRESET=ON" and PDL data "Present" as the print job to be transmitted.

In this case, according to the setting of "@PJL SET PRESET=ON", the digital multifunction machine 1 operates in such a manner that the PDL data part is not printed even after reception and is saved as preliminary settings, and the image data received according to a user's operation after reception is printed on the basis of the settings.

In this way, when the preliminary setting information for a print job is transmitted in advance from the user terminal 2 to the digital multifunction machine 1, even if the PDL data part representing the image to be printed is received, it is not printed and is saved as preliminary settings. Therefore, it is possible to realize the image forming system 100 such that it reduces the user's operational burden and increases convenience in print job settings of the digital multifunction machine 1.

Preferred embodiments of the disclosure also include those obtained by combining any of the embodiments described above.

Various modifications can be made to the disclosure in addition to the above-described embodiments. The modifications should not be construed as falling outside the scope of the disclosure. The disclosure is embodied by the claims and their equivalents, and should embrace all modifications within the scope of the claims.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image forming system comprising:
    an image forming apparatus comprising an operation panel, the image forming apparatus forming an image based on image data; and
    a user terminal having a printer driver capable of configuring preliminary setting information of a print job pertaining to formation of the image, wherein:
    the user terminal is configured to transmit the preliminary setting information configured by the printer driver to the image forming apparatus,
    when the image forming apparatus is accessed by a user after receiving the preliminary setting information, the image forming apparatus transitions to an image-data acquisition standby state to accept an operation to acquire the image data, and when the image data is acquired, the image forming apparatus forms the image based on the image data by applying the preliminary setting information, and
    the printer driver, which generates the preliminary setting information, transmits the preliminary setting information to the image forming apparatus in accordance with an operation selected on the preliminary setting by the user using a print setting screen for the printer driver.

2. The image forming system according to claim 1, wherein:
    the preliminary setting information includes a setting for an expiration time,
    when the image forming apparatus is accessed by the user after receiving the preliminary setting information, if the expiration time of the preliminary setting information is approaching, the image forming apparatus transitions to the image-data acquisition standby state to accept the operation to acquire the image data, and when the expiration time has passed, a predetermined initial screen is displayed on the operation panel without an application of the preliminary setting information.

3. The image forming system according to claim 1, wherein the user terminal is further configured to set whether user authentication is required when the preliminary setting information is transmitted to the image forming apparatus, and when the user authentication is not set, settings pertaining to personal information and security information are deleted from the preliminary setting information before the preliminary setting information is transmitted to the image forming apparatus.

4. The image forming system according to claim 1, wherein,
    the image forming apparatus further comprises a user authenticator that accepts login authentication of a user,
    when the user, whose login authentication is accepted by the user authenticator, is a user of the user terminal that transmitted the preliminary setting information, the image forming apparatus transitions to the image-data acquisition standby state to accept the operation to acquire the image data, and when the image data is acquired, the image based on the image data is formed by applying the preliminary setting information, and
    when the user who accepted the login authentication is not the user of the user terminal that transmitted the preliminary setting information, a predetermined initial screen is displayed on the operation panel.

5. The image forming system according to claim 1, wherein,
    when the preliminary setting information is saved in the image forming apparatus, the user terminal is further configured to transmit the preliminary setting information corresponding to an added portion or a deleted portion of the preliminary setting information to the image forming apparatus, and
    when the image forming apparatus is accessed by a user after receiving the preliminary setting information corresponding to the added portion or the deleted portion of the preliminary setting information, the image forming apparatus transitions to the image-data acquisition standby state to accept the operation to acquire the image data, and when the image data is acquired, the image based on the image data is formed by reflecting and applying the preliminary setting information corresponding to the added portion or the deleted portion of the preliminary setting information to the preliminary setting information.

6. An image forming method of an image forming apparatus that forms an image based on image data, the method comprising:
    configuring preliminary setting information of a print job pertaining to formation of the image by a printer driver of a user terminal connected to the image forming apparatus via a network;
    receiving the preliminary setting information transmitted from the user terminal;
    transitioning to an image-data acquisition standby state and accepting an operation to acquire image data when a user accesses the image forming apparatus after the preliminary setting information is received; and
    applying the preliminary setting information and forming the image based on the image data when the image forming apparatus acquires the image data, wherein
    in the receiving, the image forming apparatus receives the preliminary setting information generated in accordance with an operation selected on the preliminary setting by the user using a print setting screen for the printer driver.

* * * * *